United States Patent
Kubota

(10) Patent No.: US 9,250,373 B2
(45) Date of Patent: Feb. 2, 2016

(54) ELECTRONIC APPARATUS

(75) Inventor: Takehiko Kubota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 690 days.

(21) Appl. No.: 13/591,623

(22) Filed: Aug. 22, 2012

(65) Prior Publication Data

US 2013/0063815 A1 Mar. 14, 2013

(30) Foreign Application Priority Data

Sep. 8, 2011 (JP) .................... 2011-195738

(51) Int. Cl.
| | |
|---|---|
| G02B 5/18 | (2006.01) |
| G02B 5/32 | (2006.01) |
| G02B 27/44 | (2006.01) |
| G02B 27/01 | (2006.01) |
| G02B 6/293 | (2006.01) |
| G02B 27/10 | (2006.01) |
| G02B 27/42 | (2006.01) |
| G02B 27/22 | (2006.01) |
| G03H 1/26 | (2006.01) |

(52) U.S. Cl.
CPC ............... *G02B 5/32* (2013.01); *G02B 5/1819* (2013.01); *G02B 6/29328* (2013.01); *G02B 6/29388* (2013.01); *G02B 27/017* (2013.01); *G02B 27/1086* (2013.01); *G02B 27/4272* (2013.01); *G02B 27/44* (2013.01); *G02B 27/2207* (2013.01); *G02B 2027/0112* (2013.01); *G02B 2027/0178* (2013.01); *G03H 2001/2615* (2013.01)

(58) Field of Classification Search
CPC ........ G02B 5/18; G02B 5/1819; G02B 5/1814
USPC ...................... 359/34, 13, 569, 576; 345/690
See application file for complete search history.

(56) References Cited

U.S. PATENT DOCUMENTS

| | | | |
|---|---|---|---|
| 7,784,938 B2 * | 8/2010 | Richards et al. | 351/159.65 |
| 8,396,339 B2 * | 3/2013 | Mukawa et al. | 385/31 |
| 8,508,848 B2 * | 8/2013 | Saarikko | 359/567 |
| 8,681,184 B2 * | 3/2014 | Seesselberg et al. | 345/690 |
| 2007/0188837 A1 * | 8/2007 | Shimizu et al. | 359/13 |
| 2008/0117233 A1 | 5/2008 | Mather et al. | |
| 2010/0214397 A1 | 8/2010 | Gaskevich | |

FOREIGN PATENT DOCUMENTS

| | | |
|---|---|---|
| JP | A-2008-527440 | 7/2008 |
| JP | 2009-501487 A | 1/2009 |
| JP | A-2009-186794 | 8/2009 |
| JP | A-2010-033026 | 2/2010 |

* cited by examiner

*Primary Examiner* — Audrey Y Chang
(74) *Attorney, Agent, or Firm* — Oliff PLC

(57) ABSTRACT

In an optical system, first green light reflected by a first diffractive optical element propagates in a left direction by repeating total reflection within a first light guide unit, is reflected by a third diffractive optical element, and is guided to a left eye. First red light reflected by a fifth diffractive optical element propagates in a left direction by repeating total reflection within a second light guide unit, is reflected by a seventh diffractive optical element, and is guided to a left eye. First blue light reflected by a ninth diffractive optical element is reflected by an eleventh diffractive optical element, and is guided to a left eye.

4 Claims, 8 Drawing Sheets

ELECTRONIC APPARATUS

BACKGROUND

1. Technical Field

The present invention relates to an electronic apparatus which may display a three-dimensional (3D) image.

2. Related Art

In recent years, a technology for head mounted display (hereinafter, referred to as "HMD") using a hologram optical element has been known. In JP-A-2010-33026 (see, FIG. 4), a technique for guiding an image displayed in a single display device to the left and right eyes is disclosed. In this technique, the same image is viewed by the left and right eyes.

In addition, in JP-A-2008-527440 (see, FIG. 1), a technique for guiding an image for a left eye to the left eye and guiding an image for a right eye to the right eye is disclosed. In this technique, different images are viewed by the left and right eyes.

However, in the technique disclosed in JPA-2010-33026, the same image is viewed by the left and right eyes, and therefore a 3D image cannot be displayed.

Meanwhile, in the technique disclosed in JP-A-2008-527440, different images are viewed by the left and right eyes, and therefore the 3D image can be displayed. However, two display devices are required, so that their configurations are complex, and the overall size of the HMD is increased.

SUMMARY

An advantage of some aspects of the invention is that a three-dimensional (3D) image can be displayed using a single display device.

According to an aspect of the invention, there is provided an electronic apparatus, including; a display device that, when using one light of light with a short wavelength and light with a long wavelength light centering around a first wavelength corresponding to red as first red light and the other light as second red light, using one light of light with a short wavelength and light with a long wavelength centering around a second wavelength corresponding to green as first green light and the other light as second green light, and using one light of light with a short wavelength and light with a long wavelength centering around a third wavelength corresponding to blue as first blue light and the other light as second blue light, displays an image for a left eye by the first red light, the first green light, and the first blue light, and an image for a right eye by the second red light, the second green light, and the second blue light; a first optical system that separates the first red light, the first green light, and the first blue light based on a difference between wavelengths of the first and second light of each color from light emitted from the display device, and outputs the separated light to be made incident on a left eye; and a second optical system that separates the second red light, the second green light, and the second blue light based on the difference between wavelengths of the first and second light of each color from the light emitted from the display device, and outputs the separated light to be made incident on a right eye.

According to an aspect of the invention, by outputting first and second light with mutually different wavelengths with respect to each of red, green, and blue, the image for the left eye may be formed by the first light and the image for the right eye may be formed by the second light, and therefore it is possible to separate the image for the left eye and the image for the right eye based on a difference in wavelengths of each color. For this reason, it is possible to display a 3D image using a single display device. As a result, it is possible to provide the electronic apparatus capable of being miniaturized and lightened while simplifying a configuration of the electronic apparatus.

According to another aspect of the invention, there is provided an electronic apparatus, including: a display device that, when using one light of light with a short wavelength and light with a long wavelength centering around a predetermined wavelength as first light and the other light as second light, emits the first light and the second light; an optical system that converts light emitted from the display device into parallel light; a light guide unit that includes a first surface and a second surface, and enables the parallel light emitted from the optical system to be made incident on the first surface from a reference direction that is a direction perpendicular to the first surface; a first diffractive optical element that is provided on the second surface of the light guide unit through which the parallel light emitted from the optical system is transmitted, reflects the first light having been transmitted through the light guide unit at an angle of $+\theta 1$ with respect to the reference direction, and transmits the second light having been transmitted through the light guide unit; a second diffractive optical element that is provided on an opposite surface of the light guide unit of the first diffractive optical element, and reflects the second light at a reflection angle of $-\theta 2$ with respect to the reference direction; a third diffractive optical element that is provided on the second surface of the light guide unit separated from the first diffractive optical element by a predetermined distance in a first direction, and reflects, at a reflection angle of $-\theta 1$, the first light propagated by repeating reflection within the light guide unit; and a fourth diffractive optical element that is provided on the second surface of the light guide unit separated from the second diffractive optical element by a predetermined distance in a second direction opposite to the first direction, and reflects, at a reflection angle of $+\theta 2$, the second light propagated by repeating reflection within the light guide unit.

According to another aspect of the invention, the first diffractive optical element and the second diffractive optical element which have different reflection angles are provided, and therefore the first light and the second light are guided in mutually opposed directions in the light guide unit. In addition, using the third and fourth diffractive optical elements, it is possible to output mutually different images to left and right eyes. Due to this, it is possible to display a 3D image using a single display device. As a result, it is possible to provide the electronic apparatus capable of being miniaturized and lightened while simplifying a configuration of the electronic apparatus.

In the electronic apparatus, a predetermined wavelength may include a first wavelength corresponding to red, a second wavelength corresponding to green, and a third wavelength corresponding to blue, the first light may include a first red light corresponding to red, a first green light corresponding to green, and a first blue light corresponding to blue, the second light may include a second red light corresponding to red, a second green light corresponding to green, and a second blue light corresponding to blue, the first diffractive optical element may reflect the first red light, the first green light, and the first blue light at an angle of $+\theta 1$ with respect to the reference direction and transmit the second red light, the second green light, and the second blue light each having been transmitted through the light guide unit, the second diffractive optical element may reflect the second red light, the second green light, and the second blue light at an angle of $-\theta 2$ with respect to the reference direction, the third diffractive optical element may reflect the first red light, the first green light, and the first blue light at an angle of −θ1 with respect to the reference direction, and the fourth diffractive optical element may reflect the second red light, the second green light, and the second blue light at an angle of +θ2 with respect to the reference direction.

According to another aspect of the invention, it is possible to display a 3D color image using a single display device. Accordingly, it is possible to enable the electronic apparatus to be thinner.

According to still another aspect of the invention, there is provided a head mounted display, including: a display device that, when using one light of light with a short wavelength and light with a long wavelength light centering around a first wavelength corresponding to red as first red light and the other light as second red light, using one light of light with a short wavelength and light with a long wavelength centering around a second wavelength corresponding to green as first green light and the other light as second green light, and using one light of light with a short wavelength and light with a long wavelength centering around a third wavelength corresponding to blue as first blue light and the other light as second blue light, displays an image for a left eye by the first red light, the first green light, and the first blue light, and an image for a right eye by the second red light, the second green light, and the second blue light; an optical system that converts light emitted from the display device into parallel light; a first light guide unit that includes a first surface and a second surface, and enables the parallel light emitted from the optical system to be made incident on the first surface from a reference direction that is a direction perpendicular to the first surface; a first diffractive optical element that is provided on the second surface of the first light guide unit through which the parallel light emitted from the optical system is transmitted, reflects the first green light having been transmitted through the first light guide unit at an angle of +θ1 with respect to the reference direction, and transmits the second green light, the first and second red light, and the first and second blue light each having been transmitted through the first light guide unit; a second diffractive optical element that is provided on an opposite surface of the first light guide unit of the first diffractive optical element, reflects the second green light at a reflection angle of −θ2 with respect to the reference direction, and transmits the first and second red light and the first and second blue light; a third diffractive optical element that is provided on the second surface of the first light guide unit separated from the first diffractive optical element by a predetermined distance in a left direction, and reflects, at a reflection angle of −θ1, the first green light propagated by repeating reflection within the first light guide unit; a fourth diffractive optical element that is provided on the second surface of the first light guide unit separated from the second diffractive optical element by a predetermined distance in a right direction, and reflects, at a reflection angle of +θ2, the second green light propagated by repeating reflection within the first light guide unit; a second light guide unit that includes a third surface and a fourth surface in contact with the second diffractive optical element, and enables the first and second red light and the first and second blue light each having been transmitted through the second diffractive optical element to be made incident on the third surface; a fifth diffractive optical element that is provided on the fourth surface of the second light guide unit, reflects the first red light at an angle of +θ3 with respect to the reference direction, and transmits the second red light and the first and second blue light each having been transmitted through the second light guide unit; a sixth diffractive optical element that is provided on an opposite surface of the second light guide unit of the fifth diffractive optical element, reflects the second red light at a reflection angle of −θ4 with respect to the reference direction, and transmits the first and second blue light; a seventh diffractive optical element that is provided on the fourth surface of the second light guide unit separated from the fifth diffractive optical element by a predetermined distance in a left direction, and reflects, at a reflection angle of −θ3, the first red light propagated by repeating reflection within the second light guide unit; an eighth diffractive optical element that is provided on the fourth surface of the second light guide unit separated from the sixth diffractive optical element by a predetermined distance in a right direction, and reflects, at a reflection angle of +θ4, the second red light propagated by repeating reflection within the second light guide unit; a ninth diffractive optical element that is provided so as to be in contact with an opposite surface of the fifth diffractive optical element of the sixth diffractive optical element, reflects the first blue light at an angle of +θ5 with respect to the reference direction, and transmits the second blue light having been transmitted through the sixth diffractive optical element; a tenth diffractive optical element that is provided so as to be in contact with an opposite surface of the sixth diffractive optical element of the ninth diffractive optical element, and reflects the second blue light at an angle of −θ6 with respect to the reference direction; an eleventh diffractive optical element that is provided so as to be in contact with the seventh diffractive optical element while separated from the ninth diffractive optical element in a left direction by a predetermined distance, and reflects, at a reflection angle of −θ5, the first blue light propagated by repeating reflection within the second light guide unit; and a twelfth diffractive optical element that is provided so as to be in contact with the eighth diffractive optical element while separated from the tenth diffractive optical element by a predetermined distance in a right direction, and reflects, at a reflection angle of +θ6, the second blue light propagated by repeating reflection within the second light guide unit.

According to still another aspect of the invention, the display device may output the first light and the second light with different wavelengths with respect to each of red, green, and blue. Six diffractive optical elements may be used to separate these six kinds of light in left and right directions, and used to further guide the separated light to the left and right eyes. Due to this, the image for the left eye may be formed by the first light, and the image for the right eye may be formed by the second light, and therefore the image for the left eye and the image for the right eye may be separated based on a difference in wavelengths of each color. As a result, it is possible to display a 3D image using a single display device. In addition, the first to fourth diffractive optical elements corresponding to green may be disposed as closer to the human eyes compared to the fifth to twelfth diffractive optical elements corresponding to blue and red, and therefore the green light may reduce the effect of the loss of the diffractive optical element. Human visibility is higher in green compared to red and blue, and therefore it is possible to improve quality of a display image.

According to still another aspect of the invention, there is provided an electronic apparatus, including: a display device that, when using one light of light with a short wavelength and light with a long wavelength light centering around a first wavelength corresponding to red as first red light and the other light as second red light, using one light of light with a short wavelength and light with a long wavelength centering around a second wavelength corresponding to green as first green light and the other light as second green light, and using one light of light with a short wavelength and light with a long wavelength centering around a third wavelength corresponding to blue as first blue light and the other light as second blue light, displays an image for a left eye by the first red light, the first green light, and the first blue light, and an image for a right eye by the second red light, the second green light, and the second blue light; an optical system that converts light emitted from the display device into parallel light; a first light guide unit that includes a first surface and a second surface, and enables the parallel light emitted from the optical system to be made incident on the first surface from a reference direction that is a direction perpendicular to the first surface; a first diffractive optical element that is provided on the second surface of the first light guide unit through which the parallel light emitted from the optical system is transmitted, reflects the first green light having been transmitted through the first light guide unit at an angle of $+\theta 1$ with respect to the reference direction, and transmits the second green light, the first and second red light, and the first and second blue light each having been transmitted through the first light guide unit; a second diffractive optical element that is provided on an opposite surface of the first light guide unit of the first diffractive optical element, reflects the second green light at a reflection angle of $-\theta 2$ with respect to the reference direction, and transmits the first and second red light and the first and second blue light; a third diffractive optical element that is provided on the second surface of the first light guide unit separated from the first diffractive optical element by a predetermined distance in a left direction, and reflects, at a reflection angle of $-\theta 1$, the first green light propagated by repeating reflection within the first light guide unit; a fourth diffractive optical element that is provided on the second surface of the first light guide unit separated from the second diffractive optical element by a predetermined distance in a right direction, and reflects, at a reflection angle of $+\theta 2$, the second green light propagated by repeating reflection within the first light guide unit; a second light guide unit that includes a third surface and a fourth surface in contact with the second diffractive optical element, and enables the first and second red light and the first and second blue light each having been transmitted through the second diffractive optical element to be made incident on the third surface; a fifth diffractive optical element that is provided on the fourth surface of the second light guide unit, reflects the first blue light at an angle of $+\theta 3$ with respect to the reference direction, and transmits the second blue light and the first and second red light each having been transmitted through the second light guide unit; a sixth diffractive optical element that is provided on an opposite surface of the second light guide unit of the fifth diffractive optical element, reflects the second blue light at a reflection angle of $-\theta 4$ with respect to the reference direction, and transmits the first and second red light; a seventh diffractive optical element that is provided on the fourth surface of the second light guide unit separated from the fifth diffractive optical element by a predetermined distance in a left direction, and reflects, at a reflection angle of $-\theta 3$, the first blue light propagated by repeating reflection within the second light guide unit; an eighth diffractive optical element that is provided on the fourth surface of the second light guide unit separated from the sixth diffractive optical element by a predetermined distance in a right direction, and reflects, at a reflection angle of $+\theta 4$, the second blue light propagated by repeating reflection within the second light guide unit; a ninth diffractive optical element that is provided so as to be in contact with an opposite surface of the fifth diffractive optical element of the sixth diffractive optical element, reflects the first red light at an angle of $+\theta 5$ with respect to the reference direction, and transmits the second red light having been transmitted through the sixth diffractive optical element; a tenth diffractive optical element that is provided so as to be in contact with an opposite surface of the sixth diffractive optical element of the ninth diffractive optical element, and reflects the second red light at an angle of $-\theta 6$ with respect to the reference direction; an eleventh diffractive optical element that is provided so as to be in contact with the seventh diffractive optical element while separated from the ninth diffractive optical element in a left direction by a predetermined distance, and reflects, at a reflection angle of $-\theta 5$, the first red light propagated by repeating reflection within the second light guide unit; and a twelfth diffractive optical element that is provided so as to be in contact with the eighth diffractive optical element while separated from the tenth diffractive optical element by a predetermined distance in a right direction, and reflects, at a reflection angle of $+\theta 6$, the second red light propagated by repeating reflection within the second light guide unit.

According to the invention, the display device may output the first light and the second light with different wavelengths with respect to each of red, green, and blue. Six diffractive optical elements may be used to separate these six kinds of light in left and right directions, and used to further guide the separated light to the left and right eyes. Due to this, the image for the left eye may be formed by the first light, and the image for the right eye may be formed by the second light, and therefore the image for the left eye and the image for the right eye may be separated based on a difference in wavelengths of each color. As a result, it is possible to display a 3D image using a single display device. In addition, the first to fourth diffractive optical elements corresponding to green may be disposed as closer to the human eyes compared to the fifth to twelfth diffractive optical elements corresponding to blue and red, and therefore the green light may reduce the effect of the loss of the diffractive optical element. Human visibility is higher in green than in red and blue, and therefore it is possible to improve quality of a display image.

In the above-described electronic apparatus, it is preferable that the display device include a plurality of pixels, and each of the plurality of pixels include a light emitting element which emits light by any one of the first and second red light, the first and second green light, and the first and second blue light. In this case, the light emitting element may be an organic light emitting diode element or inorganic EL light emitting diode element.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
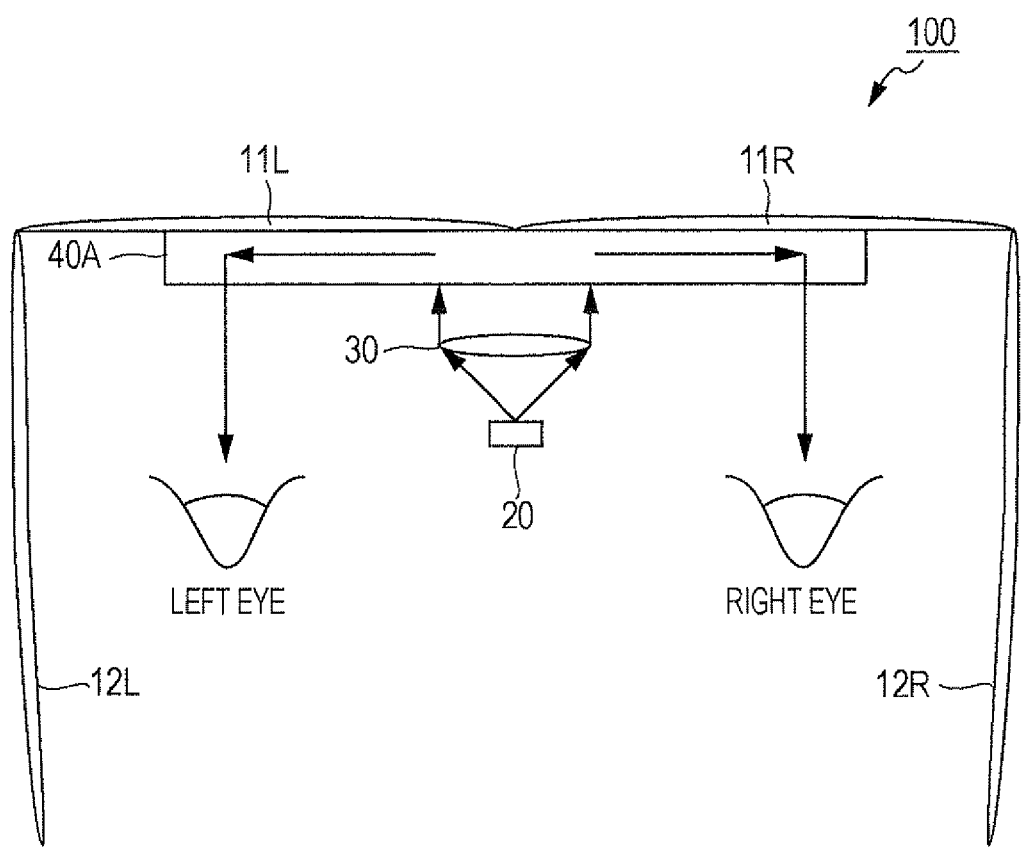
FIG. 1 is a plan view showing a schematic configuration of a head mounted display (HMD) according to a first embodiment of the invention.

FIG. 1 is a plan view showing a schematic configuration of a head mounted display 100 (hereinafter, referred to as "HMD") that is an example of an electronic apparatus according to the invention. The HMD 100 is a spectacle like display device mounted on a head portion of the human (user), and includes first portion 11L corresponding to a left eye, a second unit 11R corresponding to a right eye, a temple portion 12L put on a left ear, a temple portion 12R put on a right ear, and a light emitting device 20 generating a display image. The temple portion 12L is mounted to a left end portion of the first portion 11L, and the temple portion 12R is mounted to a right end portion of the second unit 11R. The HMD 100 is mounted on the head portion of the user in such a manner that the temple portion 12L is put on the left ear, the temple portion 12R is put on the right ear, and a nose pad not shown is brought into contact with the nose.

Light emitted from the light emitting device 20 is converted into parallel light by a lens 30 to be guided to an optical system 40A. In this example, the emitted light of the light emitting device 20 is converted into the parallel light by the lens 30, but any optical system instead of the lens 30 may be used as long as the emitted light can be converted into the parallel light, and for example, a combination of a plurality of lens may be used.

Figure 2:
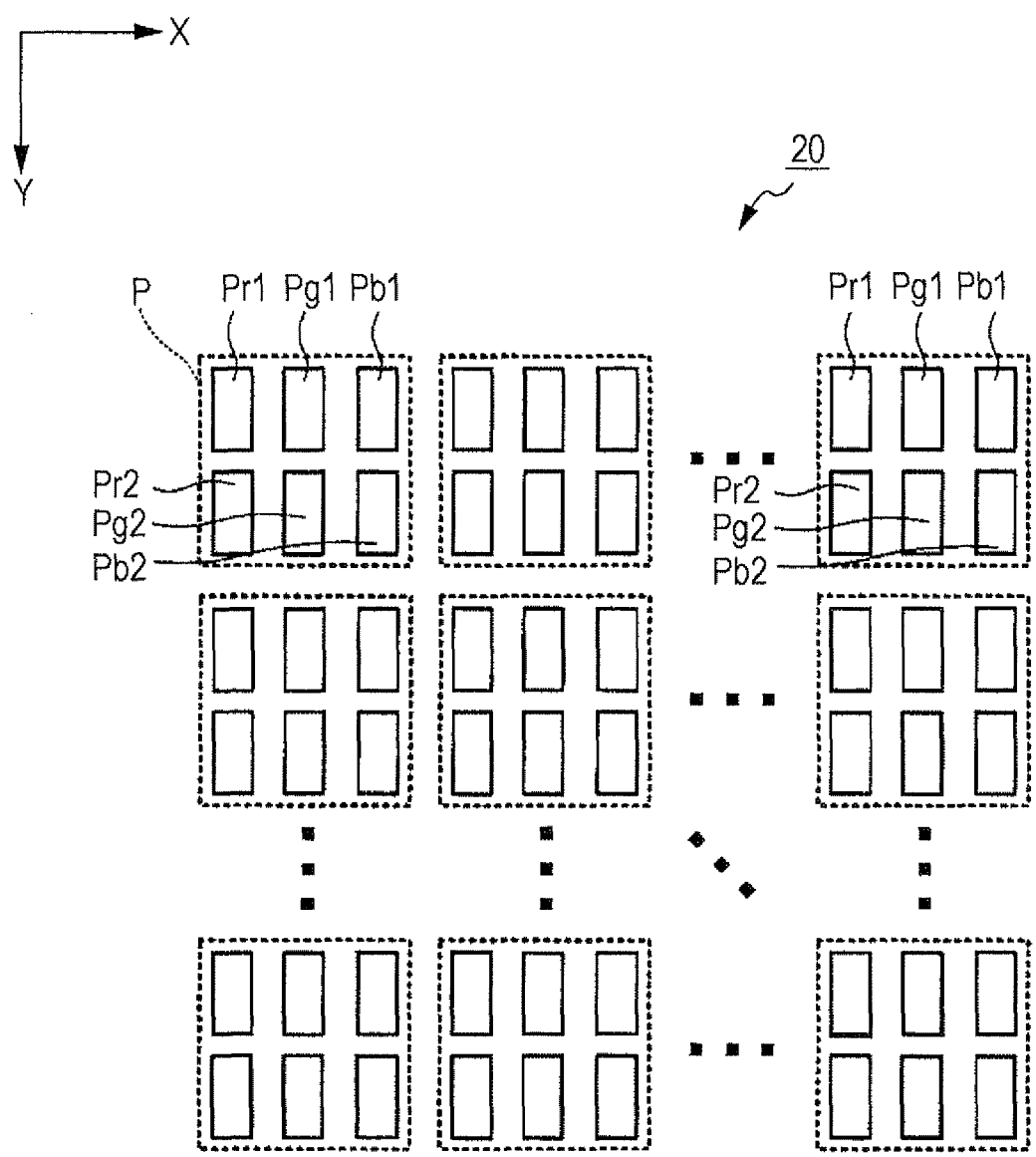
FIG. 2 is an explanatory view schematically showing pixels of a light emitting device according to the same embodiment of the invention.

FIG. 2 is an explanatory view schematically showing pixels of the light emitting device 20. As shown in FIG. 2, in the light emitting device 20, a plurality of pixels P are formed along the X direction and the Y direction. The pixels P include sub pixels Pr1, Pg1, Pb1, Pr2, Pg2, and Pb2.

An image for a left eye is displayed in the sub pixels Pr1, Pg1, and Pb1, and an image for a right eye is displayed in sub pixels Pr2, Pg2, and Pb2. In addition, each sub pixel includes, as a light emitting element, an organic electroluminescent (EL) element or an organic light emitting diode element (hereinafter, referred to as "OLED element") which is referred to as a polymer light emitting element.

In addition, the sub pixels Pr1 and Pr2 correspond to red, the sub pixels Pg1 and Pg2 correspond to green, and the sub pixels Pb1 and Pb2 correspond to blue.

Figure 3:
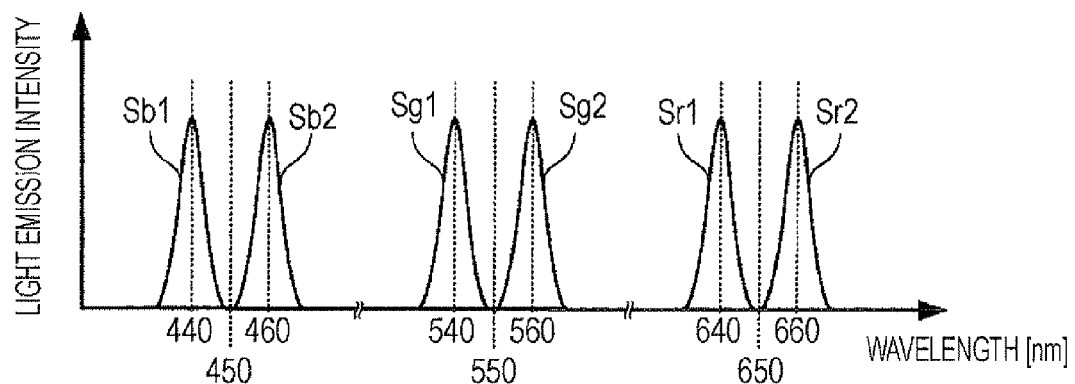
FIG. 3 is a graph showing characteristics of light emitted from a light emitting device.

Next, in FIG. 3, light emitting spectrums of an OLED element of each sub pixel are illustrated. First, an OLED element of the sub pixel Pr1 emits first red light R1 with a short wavelength centering around 650 nm (first wavelength). As shown in FIG. 3, the light emitting spectrum Sr1 has a peak wavelength of 640 nm which is shorter than the first wavelength. Meanwhile, an OLED element of the sub pixel Pr2 emits second red light R2 with a long wavelength centering around 650 nm (first wavelength). As shown in FIG. 3, a light emitting spectrum Sr2 has a peak wavelength 660 nm which is longer than the first wavelength. In addition, a difference in the peak wavelengths between the light emitting spectrums Sr1 and Sr2 is selected in a range in which people feels no sense of incongruity toward a difference in colors when viewing.

Next, an OLED element of the sub pixel Pg1 emits first green light G1 with a short wavelength centering around 550 nm (second wavelength). As shown in FIG. 3, a light emitting spectrum Sg1 has a peak wavelength of 540 nm which is shorter than the second wavelength. Meanwhile, an OLED element of the sub pixel Pg2 emits second green light G2 with a long wavelength centering around 550 nm (second wavelength). As shown in FIG. 3, a light emitting spectrum Sg2 has a peak wavelength of 560 nm which is longer than the second wavelength. In addition, a difference in the peak wavelengths between the light emitting spectrums Sg1 and Sg2 is selected in a range in which person feels no sense of incongruity toward a difference in colors when viewing.

Next, an OLED element of the sub pixel Pb1 emits first blue light B1 with a short wavelength centering around 450 nm (third wavelength). As shown in FIG. 3, a light emitting spectrum Sb1 has a peak wavelength of 440 nm which is shorter than the third wavelength. Meanwhile, an OLED element of the sub pixel Pb2 emits second blue light B2 with a long wavelength centering around 450 nm (third wavelength). As shown in FIG. 3, a light emitting spectrum Sb2 has a peak wavelength 460 nm which is longer than the third wavelength. In addition, a difference in the peak wavelengths between the light emitting spectrums Sb1 and Sb2 is selected in a range in which people feels no sense of incongruity toward a difference in colors when viewing.

Figure 4:
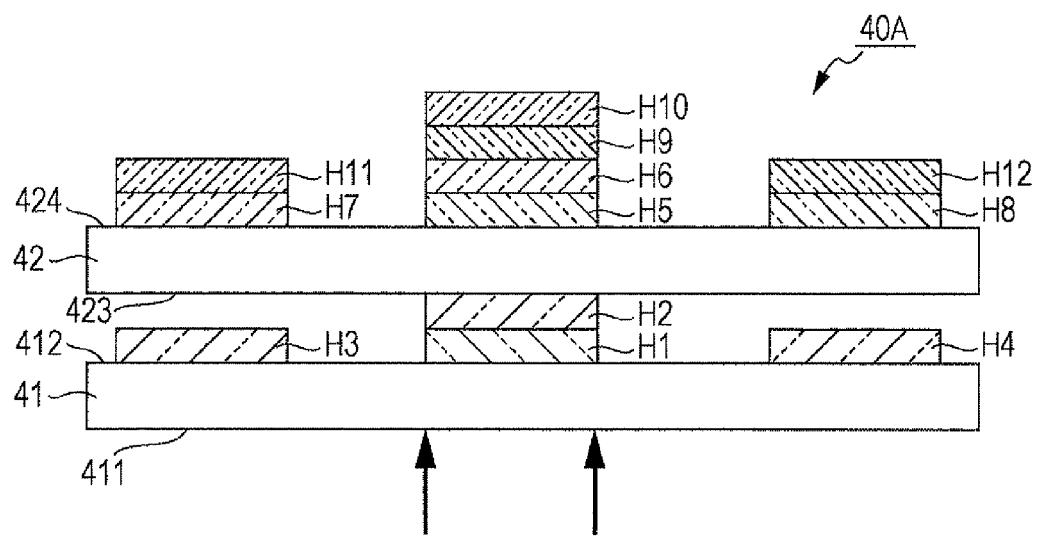
FIG. 4 is a cross-sectional view schematically showing a structure of an optical system 40A.

Next, the optical system 40A will be described. FIG. 4 is a cross-sectional view schematically showing a structure of the optical system 40A. The optical system 40A includes a first light guide unit 41, a second light guide unit 42, and first to twelfth diffractive optical elements H1 to H12. The first and second light guide units 41 and 42 may be made of, for example, glass, a plastic material, or the like. The first and second light guide units 41 and 42 transmit first and second red light R1 and R2, first and second green light G1 and G2, and first and second blue light B1 and B2. In addition, parallel light from the lens 30 is incident on a first surface 411 of the first light unit 41 from a reference direction that is a direction perpendicular to the first surface 411, and the first surface 411 and a second surface 412 are parallel to each other. In addition, a third surface 423 of the second light guide unit 42 is parallel to a fourth surface 424. In addition, the first surface 411 and the second surface 412 of the first light guide unit 41 may be curved without being parallel to each other, and the third surface 423 and the fourth surface 424 of the second light guide unit 42 may be curved without being parallel to each other.

The first to twelfth diffractive optical elements H1 to H12 are so-called hologram optical elements, and have optical characteristics such as reflecting light with a predetermined wavelength at a predetermined angle and transmitting light other than the reflected light. The first diffractive optical element H1 is formed on the second surface 412 of the first light guide unit 41, and the second diffractive optical element H2 is formed so as to be in contact with an opposite surface of the first light guide unit 41 of the first diffractive optical element H1. In addition, the opposite surface of the first diffractive optical element H1 of the second diffractive optical element H2 is in contact with the second light guide unit 42.

In addition, the third diffractive optical element H3 is formed on the second surface 412 of the first light guide unit 41 while being separated from the first diffractive optical element H1 by a predetermined distance in a left direction, and the fourth diffractive optical element H4 is formed on the second surface 412 of the first light guide 41 while being separated from the second diffractive optical element H2 by a predetermined distance in a right direction.

In addition, the fifth diffractive optical element H5 is formed on the fourth surface 424 of the second light guide unit 42, and the sixth diffractive optical element H6 is formed so as to be in contact with an opposite surface of the second light guide unit 42 of the fifth diffractive optical element H5.

In addition, the seventh diffractive optical element H7 is formed on the fourth surface 424 of the second light guide unit 42 while being separated from the fifth diffractive optical element H5 by a predetermined distance in a left direction, and the eighth diffractive optical element H8 is formed on the fourth surface 424 of the second light guide unit 42 while being separated from the sixth diffractive optical element H6 by a predetermined distance in a right direction.

In addition, the ninth diffractive optical element H9 is formed so as to be in contact with an opposite surface of the fifth diffractive optical element H5 of the sixth diffractive optical element H6, and the tenth diffractive optical element H10 is formed so as to be in contact with an opposite surface of the sixth diffractive optical element H6 of the ninth diffractive optical element H9.

In addition, the eleventh diffractive optical element H11 is formed so as to be in contact with the seventh diffractive optical element H7 while being separated from the ninth diffractive optical element H9 by a predetermined distance in a left direction, and the twelfth diffractive optical element H12 is formed so as to be in contact with the eighth diffractive optical element H8 while being separated from the tenth diffractive optical element H10 by a predetermined distance in a right direction.

Figure 5:
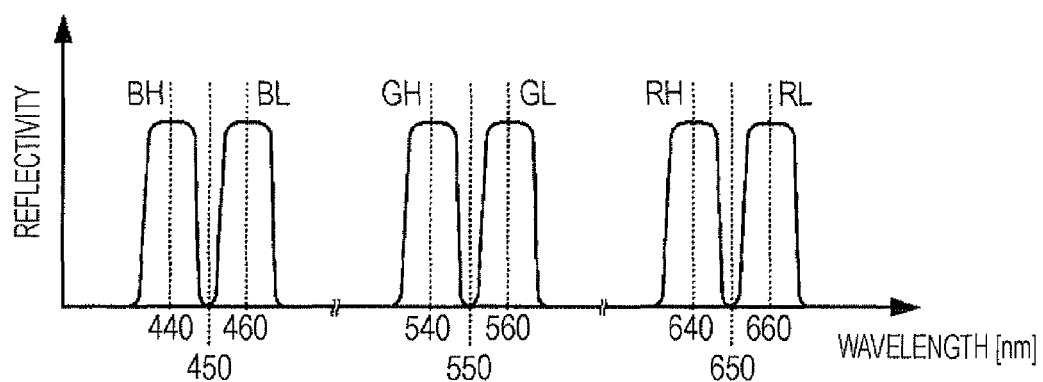
FIG. 5 is a graph showing reflection characteristics of first to twelfth diffractive optical elements.

Next, in FIG. 5, reflection characteristics of the first to twelfth diffractive optical elements H1 to H12 are illustrated.

Reflection characteristics GH are reflection characteristics of the first and third diffractive optical elements H1 and H3, and reflect first green light G1 having a peak wavelength of 540 nm and transmit first and second red light R1 and R2, second green light G2, and first and second blue light B1 and B2.

Reflection characteristics GL are reflection characteristics of the second and fourth diffractive optical elements H2 and H4, and reflect second green light G2 using 560 nm as a peak wavelength and transmit the first and second red light R1 and R2, second green light G2, and first and second blue light B1 and B2.

Reflection characteristics RH are reflection characteristics of the fifth and seventh diffractive optical elements H5 and H7, and reflect first red light R1 having a peak wavelength of 640 nm and transmit second red light R2, first and second green light G1 and G2, and first and second blue light B1 and B2.

Reflection characteristics RL are reflection characteristics of the sixth and eighth diffractive optical elements H6 and H8, and reflect second red light R2 using 660 nm as a peak wavelength and transmit first red light R1, first and second green light G1 and G2, and first and second blue light B1 and B2.

Reflection characteristics BH are reflection characteristics of the ninth and eleventh diffractive optical elements H9 and H11, and reflect first blue light B1 using 440 nm as a peak wavelength and transmit first and second red light R1 and R2, first and second green light G1 and G2, and second blue light B2.

Reflection characteristics BL are reflection characteristics of the tenth and twelfth diffractive optical elements H10 and H12, and reflect second blue light B2 using 460 nm as a peak wavelength and transmit first and second red light R1 and R2, first and second green light G1 and G2, and first blue light B1.

Figure 6A:
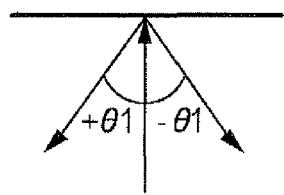
FIGS. 6A, 6B, 6C, 6D, 6E, and 6F are explanatory views showing reflection angles of first to twelfth diffractive optical elements.
Figure 6B:
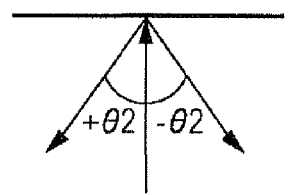

Next, reflection angles of the first to twelfth diffractive optical elements H1 to H12 will be described. As shown in FIG. 6A, the first diffractive optical element H1 has a reflection angle of $+\theta 1$, and the third diffractive optical element H3 has a reflection angle of $-\theta 1$. In addition, as shown in FIG. 6B, the second diffractive optical element H2 has a reflection angle of $-\theta 2$, and the fourth diffractive optical element H4 has a reflection angle of $+\theta 2$.

Figure 6C:
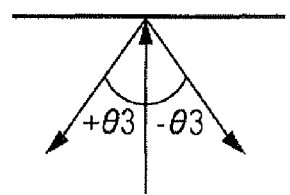
Figure 6D:
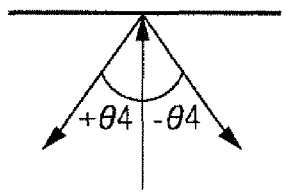

In addition, as shown in FIG. 6C, the fifth diffractive optical element H5 has a reflection angle of $+\theta 3$, and the seventh diffractive optical element H7 has a reflection angle of $-\theta 3$. In addition, as shown in FIG. 6D, the sixth diffractive optical element H6 has a reflection angle of $-\theta 4$, and the eighth diffractive optical element H8 has a reflection angle of $+\theta 4$.

Figure 6E:
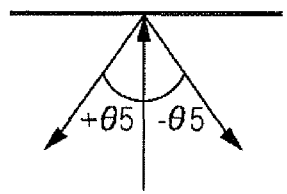
Figure 6F:
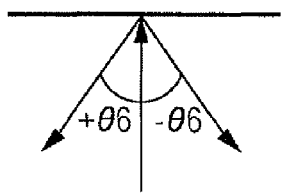

In addition, as shown in FIG. 6E, the ninth diffractive optical element H9 has a reflection angle of $+\theta 5$, and the eleventh diffractive optical element H11 has a reflection angle of $-\theta 5$. In addition, as shown in FIG. 6F, the tenth diffractive optical element H10 has a reflection angle of $-\theta 6$, and the twelfth diffractive optical element H12 has a reflection angle of $+\theta 6$.

Further, $\theta 1=\theta 2=\theta 3=\theta 4=\theta 5=\theta 6$ may be satisfied.

As described above, the image for the left eye is displayed in the sub pixels Pr1, Pg1, and Pb1, and the image for the right eye is displayed in the sub pixels Pr2, Pg2, and Pb2. Using the above configuration, a case in which the image for the left eye displayed on the light emitting device 20 is guided to the left eye by the optical system 40A, and the image for the right eye is guided to the right eye by the optical system 40A will be described as below.

Figure 7:
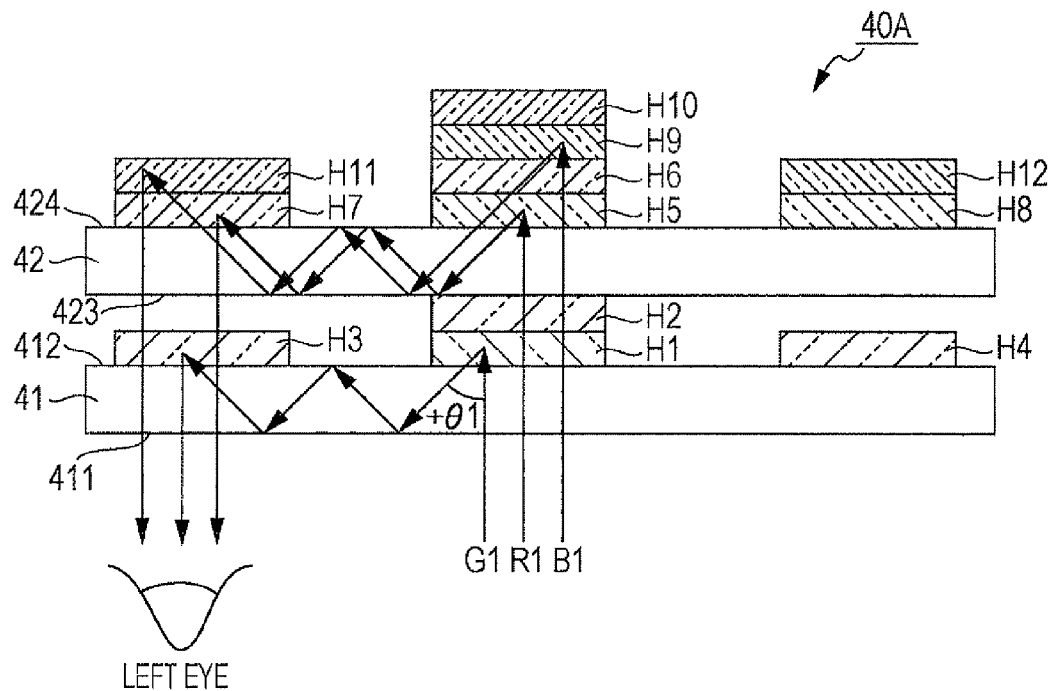
FIG. 7 is an explanatory view showing an optical path of first red light, first green light, and first blue light.

The sub pixels Pr1, Pg1, and Pb1 respectively emit first red light R1, first green light G1, and first blue light B1. In FIG. 7, optical paths of the first red light R1, the first green light G1, and the first blue light B1 are shown.

First, the reflection characteristics GH of the first diffractive optical element H1 have a peak at 540 nm as shown in FIG. 5. As shown in FIG. 3, a light emitting spectrum Sg1 of the first green light G1 has a peak wavelength of 540 nm, so that the first diffractive optical element H1 reflects the first green light G1. In addition, a reflection angle is $+\theta 1$ as shown in FIG. 6A, so that the first green light G1 reflected by the first diffractive optical element H1 propagates in a left direction by repeating total reflection within the first light guide unit 41, and is made incident on the third diffractive optical element H3. The third diffractive optical element H3 has the same reflection characteristics GH as the first diffractive optical element H1, and the reflection angle is $-\theta 1$ as shown in FIG. 6A. Accordingly, the first green light G1 is reflected by the third diffractive optical element H3 to be guided to the left eye.

Next, the reflection characteristics RH of the fifth diffractive optical element H5 have a peak at 640 nm as shown in FIG. 5. As shown in FIG. 3, a light emitting spectrum Sr1 of the first red light R1 has a peak wavelength of 640 nm, so that the fifth diffractive optical element H5 reflects the first red light R1. In addition, a reflection angle is +θ3 as shown in FIG. 6θ, so that the first red light R1 reflected by the fifth diffractive optical element H5 propagates in a left direction by repeating total reflection within the second light guide unit 42, and is incident on the seventh diffractive optical element H7. The seventh diffractive optical element H7 has the same reflection characteristics RH as the fifth diffractive optical element H5, and the reflection angle is −θ3 as shown in FIG. 6θ. Accordingly, the first red light R1 is reflected by the seventh diffractive optical element H7 to be guided to the left eye.

Next, the reflection characteristics BH of the ninth diffractive optical element H9 have a peak at 440 nm as shown in FIG. 5. As shown in FIG. 3, a light emitting spectrum Sb1 of the first blue light B1 has a peak wavelength of 440 nm, so that the ninth diffractive optical element H9 reflects the first blue light B1. In addition, a reflection angle is +θ5 as shown in FIG. 6E, so that the first blue light B1 reflected by the ninth diffractive optical element H9 propagates in a left direction by repeating total reflection within the second light guide unit 42, and is made incident on the eleventh diffractive optical element H11. The eleventh diffractive optical element H11 has the same reflection characteristics BH as the ninth diffractive optical element H9, and the reflection angle is −θ5 as shown in FIG. 6E. Accordingly, the first blue light B1 is reflected by the eleventh diffractive optical element H11 to be guided to the left eye.

Figure 8:
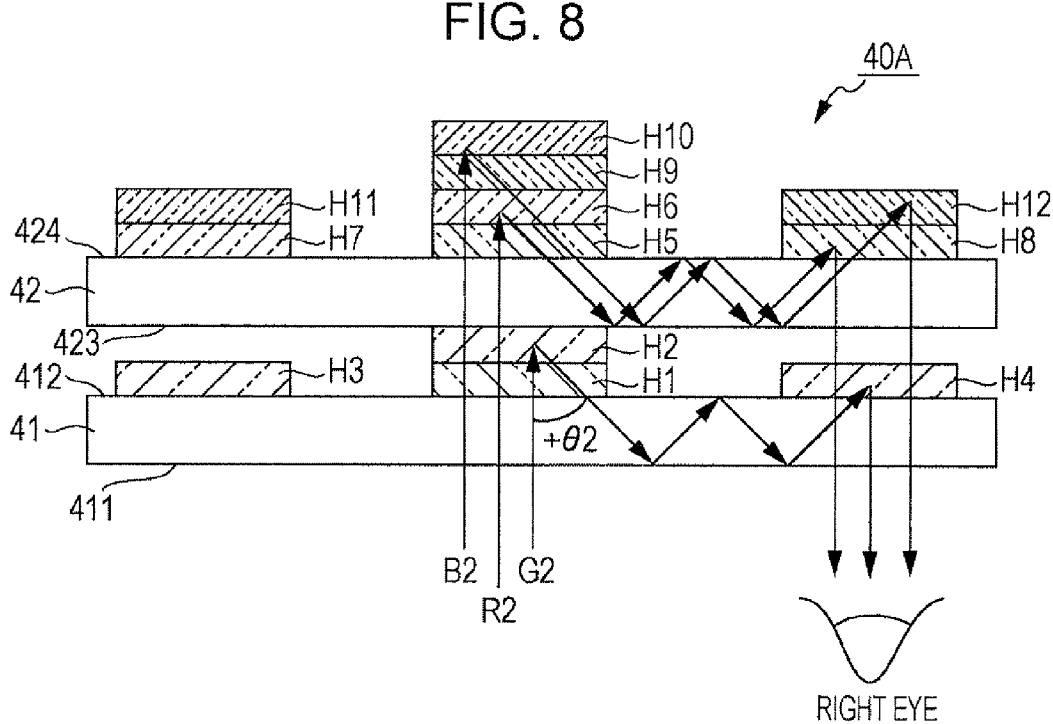
FIG. 8 is an explanatory view showing an optical path of second red light, second green light, and second blue light.

The sub pixels Pr2, Pg2, and Pb2 respectively emit second red light R2, second green light G2, and second blue light B2. In FIG. 8, optical paths of the second red light R2, the second green light G2, and the second blue light B2 are shown.

First, the reflection characteristics GL of the second diffractive optical element H2 have a peak at 560 nm as shown in FIG. 5. As shown in FIG. 3, a light emitting spectrum Sg2 of the second green light G2 has a peak wavelength of 560 nm, so that the second diffractive optical element H2 reflects the second green light G2. In addition, a reflection angle is +θ2 as shown in FIG. 6B, so that the second green light G2 reflected by the second diffractive optical element H2 propagates in a right direction by repeating total reflection within the first light guide unit 41, and is made incident on the fourth diffractive optical element H4. The fourth diffractive optical element H4 has the same reflection characteristics GL as the second diffractive optical element H2, and the reflection angle is +θ2 as shown in FIG. 6B. Accordingly, the second green light G2 is reflected by the fourth diffractive optical element H4 to be guided to the right eye.

Next, the reflection characteristics RL of the sixth diffractive optical element H6 have a peak at 660 nm as shown in FIG. 5. As shown in FIG. 3, a light emitting spectrum Sr2 of the second red light R2 has a peak wavelength of 660 nm, so that the sixth diffractive optical element H6 reflects the second red light R2. In addition, a reflection angle is −θ4 as shown in FIG. 6D, so that the second red light R2 reflected by the sixth diffractive optical element H6 propagates in a right direction by repeating total reflection within the second light guide unit 42, and is made incident on the eighth diffractive optical element H8. The eighth diffractive optical element H8 has the same reflection characteristics RL as the sixth diffractive optical element H6, and the reflection angle is +θ4 as shown in FIG. 6D. Accordingly, the second red light R2 is reflected by the eighth diffractive optical element H8 to be guided to the right eye.

Next, the reflection characteristics BL of the tenth diffractive optical element H10 have a peak at 460 nm as shown in FIG. 5. As shown in FIG. 3, a light emitting spectrum Sb2 of the second blue light B2 has a peak wavelength of 460 nm, so that the tenth diffractive optical element H10 reflects the second blue light B2. In addition, a reflection angle is −θ6 as shown in FIG. 6F, so that the second blue light B2 reflected by the tenth diffractive optical element H10 propagates in a right direction by repeating total reflection within the second light guide unit 42, and is made incident on the twelfth diffractive optical element H12. The twelfth diffractive optical element H12 has the same reflection characteristics BL as the tenth diffractive optical element H10, and the reflection angle is +θ6 as shown in FIG. 6F. Accordingly, the second blue light B2 is reflected by the twelfth diffractive optical element H12 to be guided to the right eye.

In the present embodiment, the light emitting device 20 displays the image for the left eye and the image for the right eye by red, green, and blue light which are wavelength-shifted in a degree in which people feel no sense of incongruity, and each light is guided to the left and right eyes using wavelength selectivity of the diffractive optical elements. Due to this, a 3D image may be displayed using a single light emitting device 20.

In the above-described embodiment, the first to fourth diffractive optical elements H1 to H4 which reflect the first and second green light G1 and G2 are disposed as closer to the human eyes compared to the fifth to twelfth diffractive optical elements H5 to H12 which reflects red and blue light. The diffractive optical element has excellent transmission characteristics of the wavelength, but a slight loss may arise from the transmission characteristics. Sensitivity of human eyes is higher in green compared to red and blue. By the above-described disposition, it is possible to reduce a loss of the green light, thereby displaying a high-quality image.

In addition, in the present embodiment, the lens 30, the first light guide unit 41, the first diffractive optical element H1, the third diffractive optical element H3, the second light guide unit 42, the fifth diffractive optical element H5, the seventh diffractive optical element H7, the ninth diffractive optical element H9, and the eleventh diffractive optical element H11 may act as the first optical system that separates the first red light R1, the first green light G1, and the first blue light B1 from the light emitted from the light emitting device 20 based on a difference in wavelengths of the first and second light of each color, and outputs the separated light to be made incident on the left eye. In addition, the lens 30, the first light guide unit 41, the second diffractive optical element H2, the fourth diffractive optical element H4, the second light guide unit 42, the sixth diffractive optical element H6, the eighth diffractive optical element H8, the tenth diffractive optical element H10, and the twelfth diffractive optical element H12 may act as the second optical system that separates the first second light R2, the second green light G2, and the second blue light B2 from the light emitted from the light emitting device 20 based on a difference in wavelengths of the first and second light of each color, and outputs the separated light to be made incident on the right eye.

Second Embodiment

In the first embodiment, the first to twelfth diffractive optical elements H1 to H12 selectively reflect light with one wavelength, and transmit light with other wavelengths. In contrast, the HMD 100 according to the second embodiment has a difference in that a single diffractive optical element selectively reflects three wavelengths. In addition, the HMD 100 according to the second embodiment has the same configuration as that of the HMD 100 according to the first embodiment except that an optical system 40B is used instead of the optical system 40A.

Figure 9:
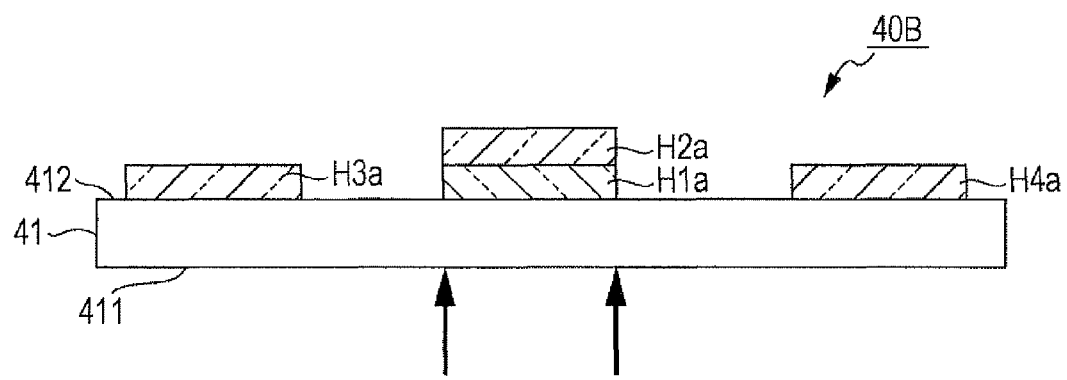
FIG. 9 is a cross-sectional view schematically showing a structure of an optical system 40B used in a head mounted display (HMD) according to a second embodiment of the present invention.

FIG. 9 is a cross-sectional view schematically showing a structure of an optical system 40B according to a second embodiment of the present invention. As shown in FIG. 9, the optical system 40B includes a first light guide unit 41, a first diffractive optical element H1a formed on a second surface 412 of the first light guide unit 41, a second diffractive optical element H2a formed so as to be in contact with the first diffractive optical element H1a, a third diffractive optical element H3a formed on the second surface 412 while being separated from the first diffractive optical element H1a by a predetermined distance in a left direction, and a fourth diffractive optical element H1a formed on the second surface 412 while being separated from the second diffractive optical element H2a by a predetermined distance in a right direction.

Figure 10:
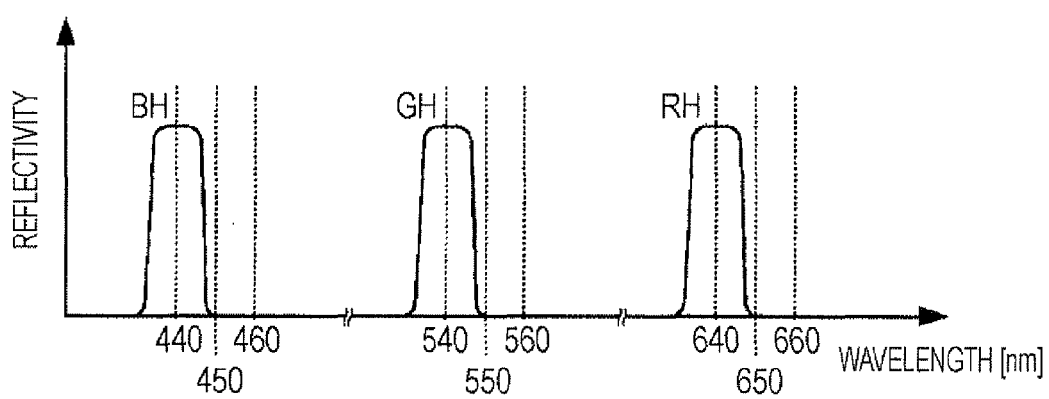
FIG. 10 is a graph showing reflection characteristics of first to third diffractive optical elements.
Figure 11:
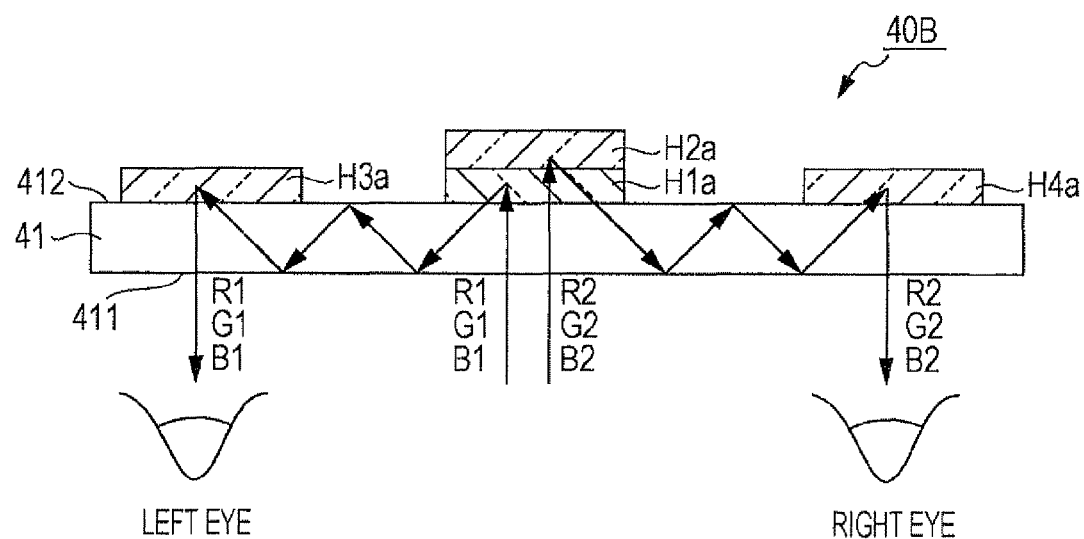
FIG. 11 is an explanatory view showing an optical path of first and second red light, first and second green light, and first and second blue light.

Here, as shown in FIG. 10, the first and third diffractive optical elements H1a and H3a have reflection characteristics RH, GH, and BH, reflect first red light R1, first green light G1, and first blue light B1, and transmit second red light R2, second green light G2, and second blue light B2. In addition, a reflection angle of the first diffractive optical element H1a is +θ1, whereas a reflection angle of the third diffractive optical element H3a is −θ1. For this reason, as shown in FIG. 11, the first red light R1, the first green light G1, and the first blue line B1 are reflected by the first diffractive optical element H1a, propagate in a left direction while being totally reflected within the first light guide unit 41, are reflected by the third diffractive optical element H3a, and are guided to a left eye.

Figure 12:
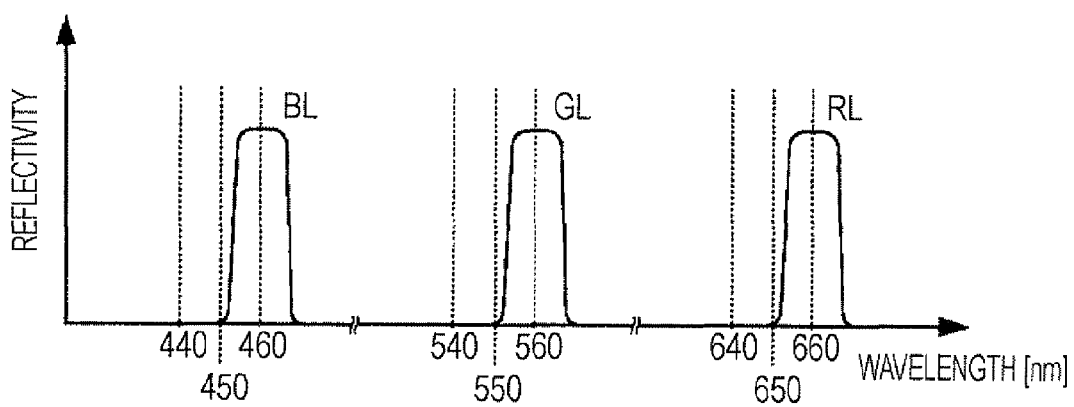
FIG. 12 is a graph showing reflection characteristics of second and fourth diffractive optical elements.

Meanwhile, as shown in FIG. 12, the second and fourth diffractive optical elements H2a and H4a have reflection characteristics RL, GL, and BL, reflect second red light R2, second green light G2, and second blue light B2, and transmit first red light R1, first green light G1, and first blue light B1. In addition, a reflection angle of the second diffractive optical element H2a is −θ1, whereas a reflection angle of the fourth diffractive optical element H4a is +θ1. For this reason, as shown in FIG. 11, the second red light R2, the second green light G2, and the second blue line B2 are reflected by the second diffractive optical element H2a, propagate in a right direction while being totally reflected within the first light guide unit 41, are reflected by the fourth diffractive optical element H4a, and are guided to a right eye.

The HMD 100 according to the second embodiment is configured such that three wavelengths are selectively reflected by a single diffractive optical element, thereby simplifying a configuration of the optical system 40B. In particular, a thickness of the HMD 100 may be reduced, thereby significantly improving usability.

In addition, according to the present embodiment, the lens 30, the first light guide unit 41, the first diffractive optical element H1a, and the third diffractive optical element H3a may act as the first optical system that separates the first red light R1, the first green light G1, and the first blue light B1 from the light emitted from the light emitting device 20 based on a difference in wavelengths of the first and second light of each color, and outputs the separated light to be made incident on the left eye. In addition, the lens 30, the first guide unit 41, the second diffractive optical element H2a, and the fourth diffractive optical element H4a may act as the second optical system that separates the second red light R2, the second green light G2, and the second blue light B2 from the light emitted from the light emitting device 20 based on a difference in wavelengths of the first and second light of each color, and outputs the separated light to be made incident on the right eye.

Third Embodiment

The HMD 100 according to a third embodiment has the same configuration as that of the HMD 100 according to the second embodiment except that the first diffractive optical element H1b is used instead of the first and second diffractive optical elements H1a and H2a.

Figure 13:
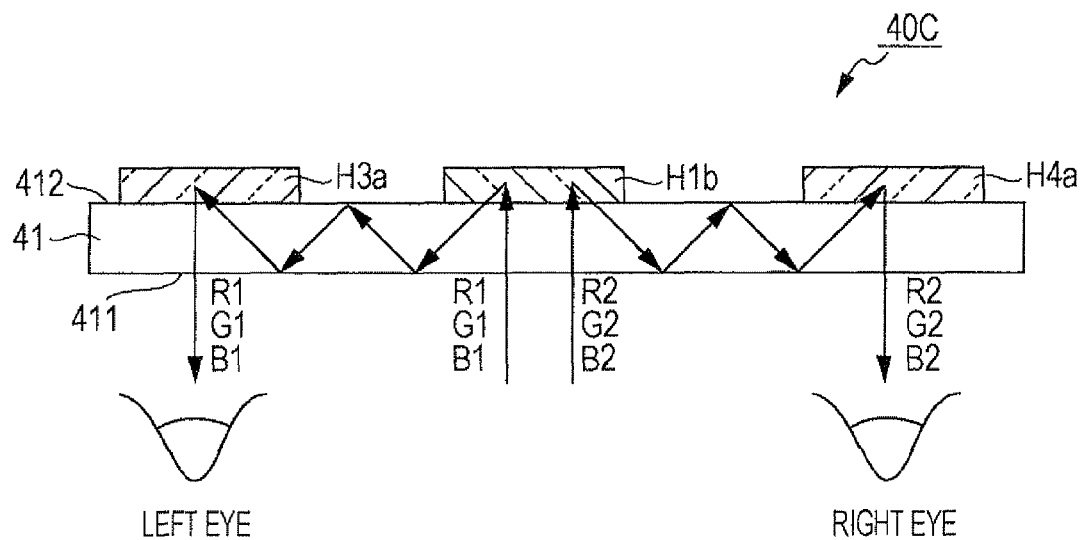
FIG. 13 is a cross-sectional view schematically showing a structure of an optical system 40C used in an HMD according to a third embodiment of the invention.

In FIG. 13, an optical system 40C using the HMD 100 according to the third embodiment is illustrated. The first diffractive optical element H1b has both a positive reflection angle of +θ1 and a negative reflection angle of −θ1. The reflection characteristics RH, GH, and BH shown in FIG. 10 are exhibited in the refection angle of +θ1, and the reflection characteristics RL, GL, and BL shown in FIG. 12 are exhibited in the reflection angle of −θ1.

Accordingly, as shown in FIG. 13, the first red light R1, the first green light G1, and the first blue light B1 are reflected by the first diffractive optical element H1b, propagate in a left direction while being totally reflected within the first light guide unit 41, are reflected by the third diffractive optical element H3a, and are guided to a left eye. Meanwhile, the second red light R2, the second green light G2, and the second blue light B2 are reflected by the first diffractive optical element H1b, propagate in a right direction while being totally reflected within the first light guide unit 41, are reflected by the fourth diffractive optical element H4a, and are guided to a right eye.

As described above, the HMD 100 according to the third embodiment is configured such that six wavelengths are selectively reflected by a single diffractive optical element, thereby simplifying a configuration of the optical system 40C.

In addition, in the present embodiment, the lens 30, the first light guide unit 41, the first diffractive optical element H1b, and the third diffractive optical element H3a may act as the first optical system that separates the first red light R1, the first green light G1, and the first blue light B1 from the light emitted from the light emitting device 20 based on a difference in wavelengths of the first and second light of each color, and outputs the separated light to be made incident on the left eye. In addition, the lens 30, the first guide unit 41, the first diffractive optical element H1b, and the fourth diffractive optical element 84a may act as the second optical system that separates the second red light R2, the second green light G2, and the second blue light B2 from the light emitted from the light emitting device 20 based on a difference in wavelengths of the first and second light of each color, and outputs the separated light to be made incident on the right eye.

MODIFIED EXAMPLES

The invention is not limited to the above-described embodiments, and for example, the following modifications are possible. In addition, at least two of the following modification examples may be combined.

Modification Example 1

In the above-described embodiments, the light emitting device 20 is used as the display device, but any display device may be used as long as the display device can obtain the light emitting spectrum shown in FIG. 3. For example, a liquid crystal display device that can obtain the light emitting spectrum shown in FIG. 3 by combining a light emission wavelength of a backlight and color filter characteristics may be used.

Modification Example 2

In the above-described embodiments, the light emitting device 20 allows the sub pixels Pr1, Pg1 and Pb1 and the sub pixels Pr2, Pg2, and Pb2 to simultaneously emit light, but the invention is not limited thereto, and may allow the sub pixels to emit light in time division. In addition, the light emitting elements that emit the first light (short wavelength) and the second light (long wavelength) to a single sub pixel may be respectively provided to be driven in time division.

Modification Example 3

Figure 14:
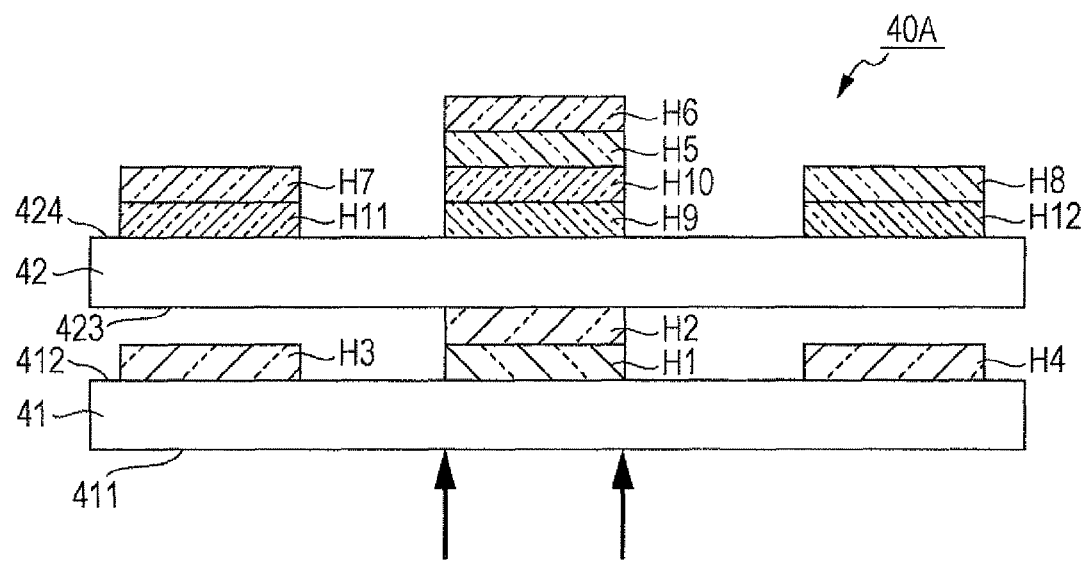
FIG. 14 is a cross-sectional view schematically showing a structure of an optical system 40A according to a modified example.

In the above-described embodiments, the first light of each color is used as the short wavelength side, and the second light thereof is used as the long wavelength side, but the invention is not limited thereto. For example, the first light may be used as the long wavelength side, and the second light may be used as the short wavelength side. In addition, according to the first embodiment, as shown in FIG. 14, the ninth diffractive optical element H9 and the tenth diffractive optical element H10 may be replaced by the sixth diffractive optical element H6 and the fifth diffractive optical element H5, the eleventh diffractive optical element H11 may be replaced by the seventh diffractive optical element H7, and the twelfth diffractive optical element H12 may be replaced by the eighth diffractive optical element H8.

Modification Example 4

In the above-described embodiments and modification examples, light of mutually different images is made incident on the left eye and the right eye by combining various kinds of diffractive optical elements, but the invention is not limited thereto. In essentials, in the display device, an image for a left eye may be displayed by the first red light, the first green light, and the first blue light, and an image for a right eye may be displayed by the second red light, the second green light, and the second blue light. In addition, the display device may include a first optical system that separates the image for the left eye from the light emitted from the display device based on a difference in wavelengths between the first and second light of each color and outputs the separated light to be made incident on the left eye, and a second optical system that separates the image for the right eye from the light emitted from the display device based on a difference in wavelengths between the first and second light of each color and outputs the separated light to be made incident on the right eye.

The entire disclosure of Japanese Patent Application No. 2011-195738, filed Sep. 8, 2011 is expressly incorporated by reference herein.

What is claimed is:

1. An electronic apparatus, comprising:
a display device that:
emits a first red light, a second red light having a longer peak wavelength than the first red light, a first green light, a second green light having a longer peak wavelength than the first green light, a first blue light, and a second blue light having a longer peak wavelength than the first blue light, and
displays an image for one of a left eye or a right eye by the first red light, the first green light, and the first blue light, and an image for another of the left eye or the right eye by the second red light, the second green light, and the second blue light;
an optical system that converts the light emitted from the display device into parallel light;
a first light guide unit that includes a first surface and a second surface, and enables the parallel light emitted from the optical system to be made incident on the first surface from a reference direction that is a direction perpendicular to the first surface;
a first diffractive optical element that is provided on the second surface of the first light guide unit through which the parallel light emitted from the optical system is transmitted, reflects the first green light having been transmitted through the first light guide unit at an angle of +θ1 with respect to the reference direction, and transmits the second green light, the first and second red light, and the first and second blue light each having been transmitted through the first light guide unit;
a second diffractive optical element that is provided on a surface of the first diffractive optical element that is opposite a surface of the first diffractive optical element in contact with the first light guide unit, reflects the second green light at a reflection angle of −θ2 with respect to the reference direction, and transmits the first and second red light and the first and second blue light;
a third diffractive optical element that is provided on the second surface of the first light guide unit separated from the first diffractive optical element by a predetermined distance in a first direction, and reflects, at a reflection angle of −θ1, the first green light propagated by repeating reflection within the first light guide unit;
a fourth diffractive optical element that is provided on the second surface of the first light guide unit separated from the second diffractive optical element by a predetermined distance in a second direction opposite to the first direction, and reflects, at a reflection angle of +θ2, the second green light propagated by repeating reflection within the first light guide unit;
a second light guide unit that includes a fourth surface and a third surface in contact with the second diffractive optical element, and enables the first and second red light and the first and second blue light each having been transmitted through the second diffractive optical element to be made incident on the third surface;
a fifth diffractive optical element that is provided on the fourth surface of the second light guide unit, reflects the first red light at an angle of +θ3 with respect to the reference direction, and transmits the second red light and the first and second blue light each having been transmitted through the second light guide unit;
a sixth diffractive optical element that is provided on a surface of the fifth diffractive optical element that is opposite a surface of the fifth diffractive optical element in contact with the second light guide unit, reflects the second red light at a reflection angle of −θ4 with respect to the reference direction, and transmits the first and second blue light;
a seventh diffractive optical element that is provided on the fourth surface of the second light guide unit separated from the fifth diffractive optical element by a predetermined distance in the first direction, and reflects, at a reflection angle of −θ3, the first red light propagated by repeating reflection within the second light guide unit;
an eighth diffractive optical element that is provided on the fourth surface of the second light guide unit separated from the sixth diffractive optical element by a predetermined distance in the second direction, and reflects, at a reflection angle of +θ4, the second red light propagated by repeating reflection within the second light guide unit;

a ninth diffractive optical element that is provided so as to be in contact with a surface of the sixth diffractive optical element that is opposite a surface of the sixth diffractive optical element in contact with the fifth diffractive optical element, reflects the first blue light at an angle of +θ5 with respect to the reference direction, and transmits the second blue light having been transmitted through the sixth diffractive optical element;

a tenth diffractive optical element that is provided so as to be in contact with a surface of the ninth diffractive optical element that is opposite a surface of the ninth diffractive optical element in contact with the sixth diffractive optical element, and reflects the second blue light at an angle of −θ6 with respect to the reference direction;

an eleventh diffractive optical element that is provided so as to be in contact with the seventh diffractive optical element while separated from the ninth diffractive optical element in the first direction by a predetermined distance, and reflects, at a reflection angle of −θ5, the first blue light propagated by repeating reflection within the second light guide unit; and a twelfth diffractive optical element that is provided so as to be in contact with the eighth diffractive optical element while separated from the tenth diffractive optical element by a predetermined distance in the second direction, and reflects, at a reflection angle of +θ6, the second blue light propagated by repeating reflection within the second light guide unit.

2. The electronic apparatus according to claim 1, wherein the display device includes a plurality of pixels, and each of the plurality of pixels includes a light emitting element which emits light by any one of the first and second red light, the first and second green light, and the first and second blue light.

3. An electronic apparatus, comprising:

a display device that:

emits a first red light, a second red light having a longer peak wavelength than the first red light, a first green light, a second green light having a longer peak wavelength than the first green light, a first blue light, and a second blue light having a longer peak wavelength than the first blue light, and displays an image for one of a left eye or a right eye by the first red light, the first green light, and the first blue light, and an image for another of the left eye or right eye by the second red light, the second green light, and the second blue light;

an optical system that converts the light emitted from the display device into parallel light;

a first light guide unit that includes a first surface and a second surface, and enables the parallel light emitted from the optical system to be made incident on the first surface from a reference direction that is a direction perpendicular to the first surface;

a first diffractive optical element that is provided on the second surface of the first light guide unit through which the parallel light emitted from the optical system is transmitted, reflects the first green light having been transmitted through the first light guide unit at an angle of +θ1 with respect to the reference direction, and transmits the second green light, the first and second red light, and the first and second blue light each having been transmitted through the first light guide unit;

a second diffractive optical element that is provided on a surface of the first diffractive optical element that is opposite a surface of the first diffractive optical element in contact with the first light guide unit, reflects the second green light at a reflection angle of −θ2 with respect to the reference direction, and transmits the first and second red light and the first and second blue light;

a third diffractive optical element that is provided on the second surface of the first light guide unit separated from the first diffractive optical element by a predetermined distance in a first direction, and reflects, at a reflection angle of −θ1, the first green light propagated by repeating reflection within the first light guide unit;

a fourth diffractive optical element that is provided on the second surface of the first light guide unit separated from the second diffractive optical element by a predetermined distance in a second direction opposite to the first direction, and reflects, at a reflection angle of +θ2, the second green light propagated by repeating reflection within the first light guide unit;

a second light guide unit that includes a fourth surface and a third surface in contact with the second diffractive optical element, and enables the first and second red light and the first and second blue light each having been transmitted through the second diffractive optical element to be made incident on the third surface;

a fifth diffractive optical element that is provided on the fourth surface of the second light guide unit, reflects the first blue light at an angle of +θ3 with respect to the reference direction, and transmits the second blue light and the first and second red light each having been transmitted through the second light guide unit;

a sixth diffractive optical element that is provided on a surface of the fifth diffractive optical element that is opposite a surface of the fifth diffractive optical element in contact with the second light guide unit, reflects the second blue light at a reflection angle of −θ4 with respect to the reference direction, and transmits the first and second red light;

a seventh diffractive optical element that is provided on the fourth surface of the second light guide unit separated from the fifth diffractive optical element by a predetermined distance in the first direction, and reflects, at a reflection angle of −θ3, the first blue light propagated by repeating reflection within the second light guide unit;

an eighth diffractive optical element that is provided on the fourth surface of the second light guide unit separated from the sixth diffractive optical element by a predetermined distance in the second direction, and reflects, at a reflection angle of +θ4, the second blue light propagated by repeating reflection within the second light guide unit;

a ninth diffractive optical element that is provided so as to be in contact with a surface of the sixth diffractive optical element that is opposite a surface of the sixth diffractive optical element in contact with the fifth diffractive optical element, reflects the first red light at an angle of +θ5 with respect to the reference direction, and transmits the second red light having been transmitted through the sixth diffractive optical element;

a tenth diffractive optical element that is provided so as to be in contact with a surface of the ninth diffractive optical element that is opposite a surface of the ninth diffractive optical element in contact with the sixth diffractive optical element, and reflects the second red light at an angle of −θ6 with respect to the reference direction;

an eleventh diffractive optical element that is provided so as to be in contact with the seventh diffractive optical element while separated from the ninth diffractive optical element in the first direction by a predetermined distance, and reflects, at a reflection angle of −θ5, the first red light propagated by repeating reflection within the second light guide unit; and a twelfth diffractive optical element that is provided so as to be in contact with the eighth diffractive optical element while separated from the tenth diffractive optical element by a predetermined distance in the second direction, and reflects, at a reflection angle of +θ6, the second red light propagated by repeating reflection within the second light guide unit.

4. The electronic apparatus according to claim 3, wherein the display device includes a plurality of pixels, and each of the plurality of pixels includes a light emitting element which emits light by any one of the first and second red light, the first and second green light, and the first and second blue light.

* * * * *